United States Patent
Oh et al.

(10) Patent No.: US 8,270,510 B2
(45) Date of Patent: Sep. 18, 2012

(54) APPARATUS AND METHOD FOR TIME SYNCHRONIZATION AND RECEPTION APPARATUS OF OFDM SYSTEM

(75) Inventors: Hyun Seo Oh, Daejeon (KR); Hyun Kyun Choi, Daejeon (KR); Sangin Kim, Mungyeong-si (KR); Daeki Hong, Seoul (KR); Dong Yong Kwak, Daejeon (KR); Jong-Hyun Park, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 466 days.

(21) Appl. No.: 12/643,296

(22) Filed: Dec. 21, 2009

(65) Prior Publication Data
US 2010/0158164 A1    Jun. 24, 2010

(30) Foreign Application Priority Data

Dec. 22, 2008 (KR) ........................ 10-2008-0130975

(51) Int. Cl.
*H04L 27/28* (2006.01)
(52) U.S. Cl. ...................................... 375/260
(58) Field of Classification Search .................. 375/260, 375/343; 370/210
See application file for complete search history.

(56) References Cited

U.S. PATENT DOCUMENTS

| | | | | |
|---|---|---|---|---|
| 5,809,009 | A * | 9/1998 | Matsuoka et al. | 370/206 |
| 2004/0071104 | A1* | 4/2004 | Boesel et al. | 370/320 |
| 2005/0147186 | A1 | 7/2005 | Funamoto et al. | |
| 2006/0029017 | A1 | 2/2006 | Mudulodu et al. | |
| 2006/0092902 | A1* | 5/2006 | Schmidt | 370/342 |
| 2008/0152042 | A1 | 6/2008 | Adachi | |
| 2012/0113927 | A1* | 5/2012 | Akita et al. | 370/329 |

FOREIGN PATENT DOCUMENTS

| | | |
|---|---|---|
| JP | 2004-214961 | 7/2004 |
| JP | 2008-160478 | 7/2008 |
| KR | 10-2006-0003670 | 1/2006 |
| KR | 10-2008-0052192 | 6/2008 |
| WO | 2008/069437 | 6/2008 |

* cited by examiner

*Primary Examiner* — Don N Vo
(74) *Attorney, Agent, or Firm* — Staas & Halsey LLP

(57) ABSTRACT

An apparatus for time synchronization of an orthogonal frequency division multiplexing (OFDM) system oversamples a received signal using a master clock having a frequency at least four times higher than a minimum sampling frequency in a transmission apparatus, sets one of a plurality of oversampled signals to an on-time signal, and shifts each of the remaining oversampled signals by a predetermined time on the basis of the on-time signal. The apparatus for time synchronization calculates a correlation value by correlating each of the shifted signals and the on-time signal with a previously known signal, detects a maximum energy value among the calculated correlation values, and detects a start point of a frame by comparing the maximum energy value with a predetermined threshold value.

15 Claims, 5 Drawing Sheets

APPARATUS AND METHOD FOR TIME SYNCHRONIZATION AND RECEPTION APPARATUS OF OFDM SYSTEM

CROSS-REFERENCE TO RELATED APPLICATION

This application claims priority to and the benefit of Korean Patent Application No. 10-2008-0130975 filed in the Korean Intellectual Property Office on Dec. 22, 2008, the entire contents of which are incorporated herein by reference.

BACKGROUND OF THE INVENTION (a) Field of the Invention

The present invention relates to an apparatus and a method for time synchronization and a reception apparatus of an orthogonal frequency division multiplexing (OFDM) system.

(b) Description of the Related Art

A vehicle communication system that provides vehicle-to-vehicle communication and vehicle-to-infrastructure communication on the basis of a vehicle moving at high speed uses an orthogonal frequency division multiplexing (hereinafter referred to as "OFDM") scheme as a wireless LAN technology.

Since the vehicle communication system is designed assuming a wireless channel at a stoppage speed or a pedestrian speed, the performance of the system is remarkably deteriorated in a channel environment in which the vehicle moves at a high speed.

The OFDM-based wireless LAN system uses a preamble at the time of transmitting and receiving data signals. The preamble is constituted by a short training sequence and a long training sequence. A reception device detects a start point of a frame by using the short training sequence, and detects a frequency error and a channel phase error by using the long training sequence and compensates the errors. The short training sequence and the long training sequence are designed on the basis of a channel environment having a low movement speed, so it is difficult to detect an accurate frame and accurate synchronization and estimate a channel in the channel environment in which the vehicle moves at the high speed.

Further, as a master clock of the reception device, a clock operating at a double speed on the basis of a digital sampling rate of a transmission signal is used. In this case, since resolution is insufficient in acquiring a sample having maximum reception energy in the reception device, errors of a frame and symbol synchronization increase. When the errors of the frame and symbol synchronization increase, a demodulation function is performed by using a sample having low reception energy value, thereby deteriorating demodulation performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for time synchronization and a reception apparatus of an orthogonal frequency division multiplexing (OFDM) system that can increase accuracy of detection of a frame and synchronization and improve demodulation performance in a channel environment in which a vehicle moves at a high speed.

An exemplary embodiment of the present invention provides an apparatus for time synchronization of a received signal in an orthogonal frequency division multiplexing (OFDM) system. The apparatus for time synchronization includes a shift register, a plurality of correlators, a maximum value detector, and a comparator. The shift register sets one of a plurality of oversampled signals acquired by oversampling the received signal using a predetermined master clock as an on-time signal, shifts each of the remaining oversampled signals by a predetermined time on the basis of the on-time signal, and outputs the shifted signals and the on-time signal. The plurality of correlators calculate a correlation value by correlating a corresponding signal among the on-time signal and the shifted signals with a previously known signal. The maximum value detector detects a maximum energy value among the correlation values calculated by the plurality of correlators. The comparator detects a start point of a frame from the received signal by comparing a predetermined threshold value with the maximum energy value.

Another embodiment of the present invention provides a method for time synchronization of a received signal in an orthogonal frequency division multiplexing (OFDM) system. The method for time synchronization includes: oversampling and outputting the received signal by a predetermined master clock; setting one of the oversampled signals to an on-time signal, shifting the remaining oversampled signals by a predetermined time on the basis of the on-time signal; calculating a plurality of correlation values by correlating each of the on-time signal and the shifted signals with a previously known signal; detecting a maximum energy value among the plurality of correlation values; comparing a predetermined threshold value with the maximum energy value; and detecting a start point of a frame from the received signal by comparing the threshold value with the maximum energy value.

Yet another embodiment of the present invention provides a reception apparatus of an orthogonal frequency division multiplexing (OFDM) system. The reception apparatus includes an analog to digital converter, a packet detector, a time synchronizer, a frequency synchronizer, a fast Fourier transformer, and a demodulator. The analog to digital converter converts a received signal into a digital sample signal, the packet detector detects whether or not a packet is received by using the digital sample signal, and the time synchronizer oversamples the digital sample signal using a master clock having a frequency higher than a minimum sampling frequency when the packet is received and detects a start point of a frame and a signal having the maximum energy value from the received signal by using the oversampled signal and a previously known signal. The frequency synchronizer compensates a frequency offset by using the start point of the frame and signal having the maximum energy value and the fast Fourier transformer fast Fourier transforms the signal having the compensated frequency offset. In addition, the demodulator demodulates the fast Fourier transformed signal to restore data.

According to an embodiment of the present invention, it is possible to improve timing resolution of synchronization by using a master clock that is four times faster than a digital sampling signal, and by using the master clock, it is possible to remarkably improve the detection performance of a frame and a symbol and the reception performance of data in a vehicle communication system using an OFDM scheme.

DETAILED DESCRIPTION OF THE EMBODIMENTS

Figure 1:
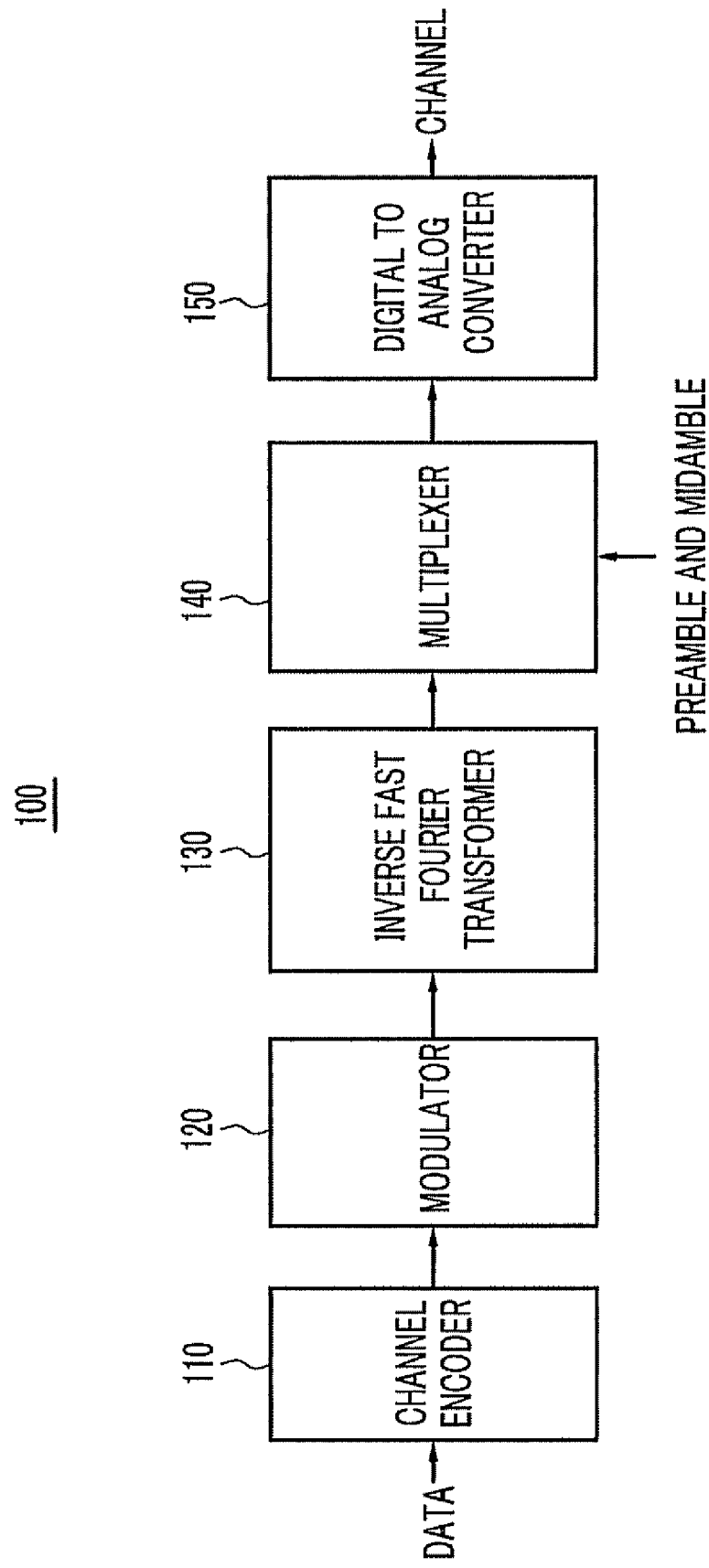
FIG. 1 is a schematic block diagram illustrating a transmission apparatus of an OFDM system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and all the appended claims, unless explicitly described to the contrary, the word "comprise" and variations such as "comprises" or "comprising" will be understood to imply the inclusion of stated elements but not the exclusion of any other elements. In addition, the terms "-er", "-or", "module", and "block" described in the specification mean units for processing at least one function and operation, and can be implemented by hardware components or software components and combinations thereof.

Hereinafter, an apparatus and a method for time synchronization and a reception apparatus of an orthogonal frequency division multiplexing (OFDM) system according to an exemplary embodiment of the present invention will be described in detail with reference to the accompanying drawings. The apparatus and method for time synchronization and the reception apparatus of the OFDM system can be adopted in a vehicle communication system using an OFDM scheme.

FIG. 1 is a schematic block diagram illustrating a transmission apparatus of an OFDM system according to an exemplary embodiment of the present invention.

Referring to FIG. 1, the OFDM system includes a transmission apparatus 100 and a reception apparatus 200.

The transmission apparatus 100 includes a channel encoder 110, a modulator 120, an inverse fast Fourier transformer 130, a multiplexer 140, and an analog to digital converter 150.

The channel coder 110 generates a bit signal by encoding data to be transmitted in a predetermined encoding scheme, and outputs the bit signal to the modulator 120. The encoding scheme may include a turbo encoding scheme having a predetermined coding rate, a convolution encoding scheme, etc.

The modulator 120 outputs a data symbol modulating the bit signal outputted from the channel encoder 110 in a predetermined scheme to the inverse fast Fourier converter 130. The modulation scheme may include BPSK having 1 bit, QPSK having 2 bits, 16-QAM having 4 bits, 64-QAM having 6 bits, and 256-QAM having 8 bits, which are data amounts to be transmitted by one subcarrier.

The inverse fast Fourier transformer 130 inverse fast Fourier transforms the data symbols modulated by the modulator 120 to output a signal of a frequency domain as a signal of a time domain.

The multiplexer 140 multiplexes predetermined signals, i.e., a preamble signal, a midamble signal, and an inverse fast Fourier transformed signal, to output one signal.

The digital to analog converter 150 converts the signal outputted from the multiplexer 140 into an analog wireless signal and transmits the analog wireless signal to the reception apparatus 200 through a channel.

Figure 2:
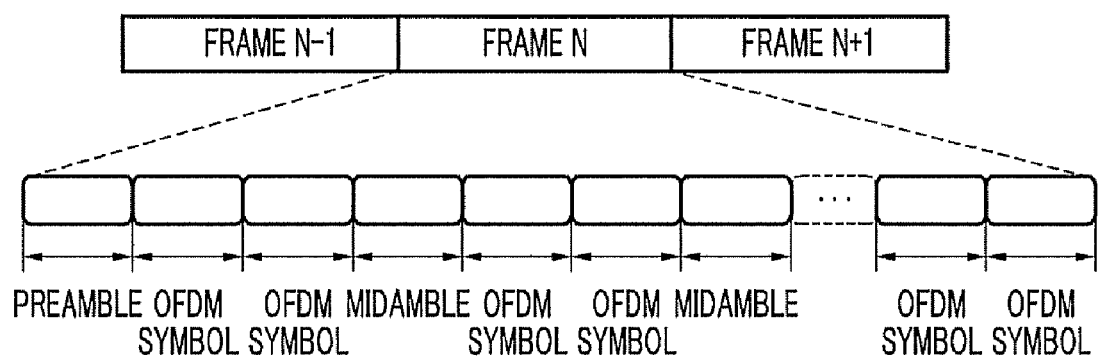
FIG. 2 is a diagram illustrating a frame structure of an OFDM system.

FIG. 2 is a diagram illustrating a frame structure of an OFDM system. Referring to FIG. 2, one frame includes a preamble, a plurality of OFDM symbols, and a plurality of midambles. The preamble is positioned at a foremost part of the frame, and may be constituted by a short training sequence (not shown) and a long training sequence (not shown) that have a repeating characteristic. Each of the OFDM symbols includes the data symbol modulated by the modulator 120 and a guard interval (not shown). The guard interval is positioned in a foregoing part of the modulated data symbol. In addition, midambles may be inserted between the OFDM symbols. The midambles perform the same function as the preamble in order to transmit data in a vehicle fading environment in which the vehicle moves at a high speed. In FIG. 2, the midamble is inserted behind two OFDM symbols, but the midamble may be inserted behind three or more OFDM symbols depending on the modulation scheme.

Figure 3:
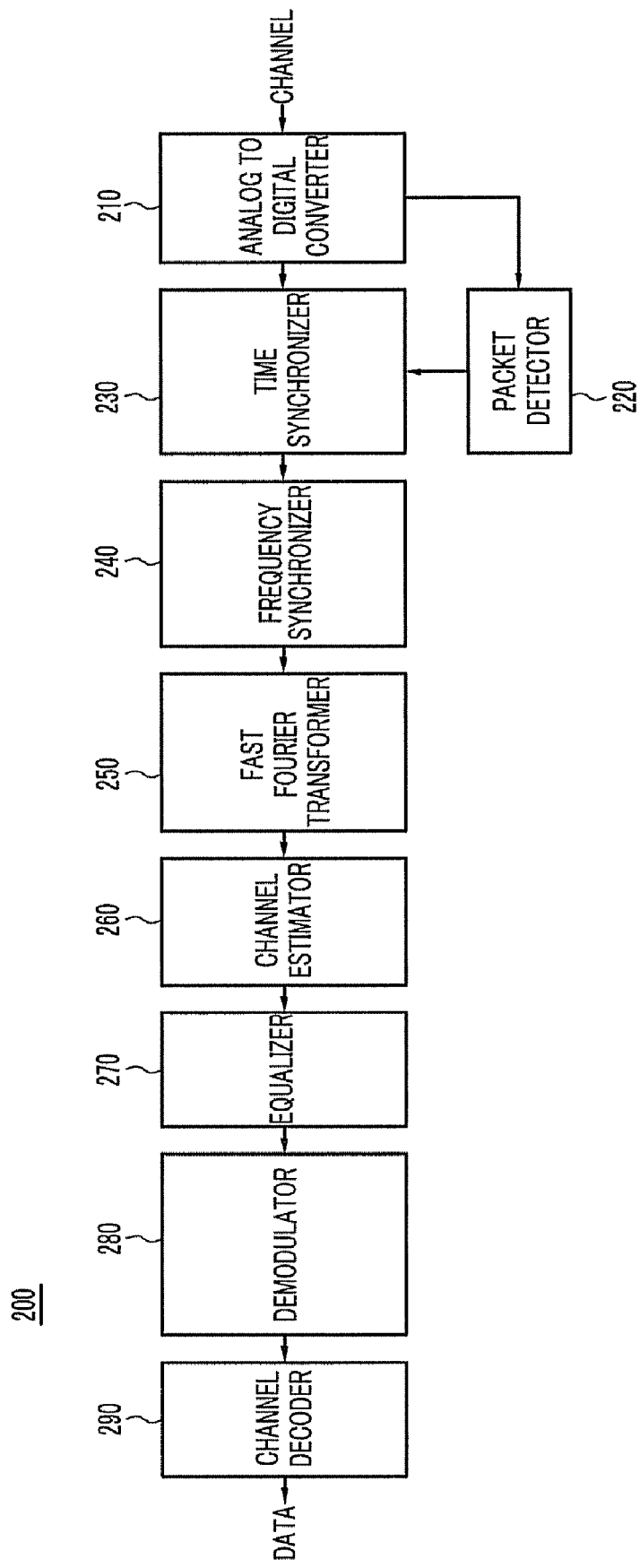
FIG. 3 is a schematic block diagram illustrating a reception apparatus of an OFDM system according to an exemplary embodiment of the present invention.

FIG. 3 is a schematic block diagram illustrating a reception apparatus of an OFDM system according to an exemplary embodiment of the present invention.

Referring to FIG. 3, the reception apparatus 200 includes an analog to digital converter 210, a packet detector 220, a time synchronizer 230, a frequency synchronizer 240, a fast Fourier transformer 250, a channel estimator 260, an equalizer 270, a demodulator 280, and a channel decoder 290.

The analog to digital converter 210 converts a received analog wireless signal into a digital sample signal.

The packet detector 220 detects whether or not a packet is received by using the digital sample signal.

The timer synchronizer 230 detects time synchronization by using the digital sample signal and a previously known signal (i.e., preamble or midamble) when the packet is received. The time synchronization includes initial synchronization detecting a start point of the frame and symbol synchronization detecting a start point of the symbol for fast Fourier transform.

The frequency synchronizer 240 acquires the time synchronization and then estimates a frequency offset by using the preamble signal and compensates the frequency offset.

The fast Fourier transformer 250 fast Fourier transforms a signal of which the frequency offset is compensated, and transforms the signal of the time domain into the signal of the frequency domain.

The channel estimator 260 extracts the preamble from the fast Fourier transformed signal and estimates the channel by using the extracted preamble. At this time, when the midamble is included in the fast Fourier transformed signal, the channel may be estimated by using the midamble. As such, it is possible to continuously estimate the channel by estimating the channel with the midamble that is inserted between the data symbols.

The equalizer 270 equalizes the fast Fourier transformed signal to compensate the channel by using a channel estimation value.

The demodulator 280 demodulates the equalized signal by using the same scheme as the modulation scheme used in the transmission apparatus 100 to extract the data symbol.

The channel decoder 290 decodes the extracted data symbol in a predetermined decoding scheme to restore the data.

Figure 4:
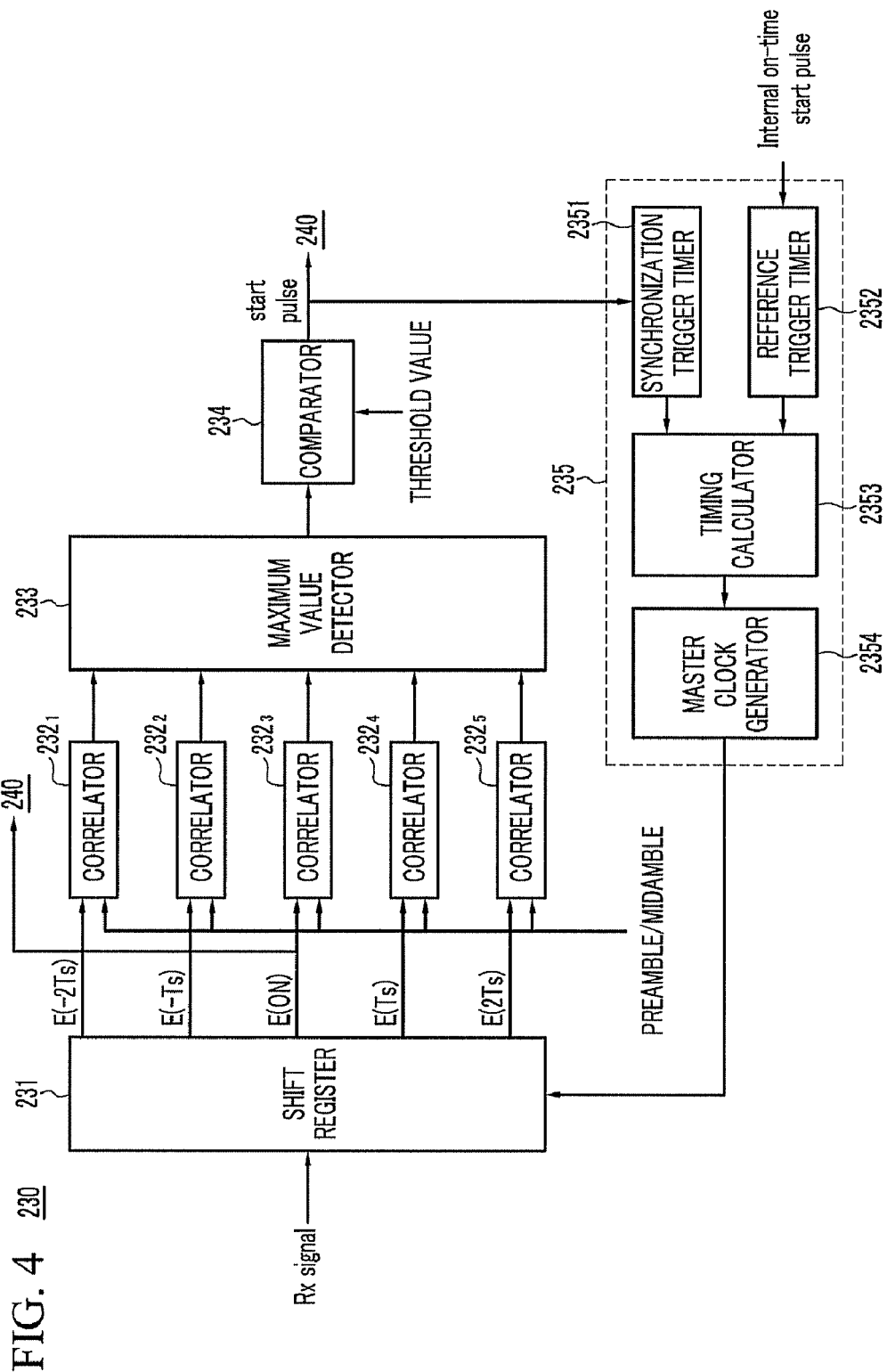
FIGS. 4 and 5 are block diagrams illustrating a time synchronizer according to first and second embodiments of the present invention.

FIG. 4 is a block diagram illustrating a time synchronizer according to a first embodiment of the present invention.

Referring to FIG. 4, the time synchronizer 230 includes a shift register 231, a plurality of correlators $232_1$ to $232_5$, a maximum value detector 233, a comparator 234, and a master clock controller 235.

The shift register 231 oversamples the digital sample signal Rx signal using a master clock having a frequency at least four times higher than a minimum sampling frequency, sets one of the oversampled signals to an on-time signal, and shifts signals oversampled by −2Ts, −Ts, Ts, and 2Ts on the basis of the on-time signal, and outputs the on-time signal E(on), signals shifted E(−2Ts), E(−Ts), E(Ts), and E(Ts).

The plurality of correlators $232_1$ to $232_5$ correlate the previously known preamble with the corresponding signal among the signals E(−2Ts), E(−Ts), E(Ts), and E(Ts) outputted from the shift register 231 to calculate a correlation value. At this time, the midamble may be used instead of the preamble.

The maximum detector 233 detects a maximum energy value among the correlation values calculated by the plurality of correlators $232_1$ to $232_5$.

The comparator 234 compares the detected maximum energy value with a predetermined threshold value, and when the detected maximum energy value is equal to or larger than the threshold value, the corresponding timing is determined as the start point of the frame. Thereafter, a start pulse indicating detection of the start point of the frame is generated and outputted to the frequency synchronizer 240.

In the first embodiment of the present invention, the on-time signal is outputted to the frequency synchronizer 240. Accordingly, it is possible to improve reception performance only when the on-time signal has the maximum energy value. Therefore, the master clock controller 235 allows the on-time signal to have the maximum energy value by adjusting the timing of the master clock by using the start pulse and an internal on-time start pulse.

The master clock controller 235 includes a synchronization trigger counter 2351, a reference trigger counter 2352, a timing calculator 2353, and a master clock generator 2354.

The synchronization trigger counter 2351 counts the number of symbol samples on the basis of the start pulse.

The reference trigger counter 2352 counts the number of symbol samples on the basis of the internal on-time start pulse.

The timing calculator 2353 compares the counted value on the basis of the internal on-time start pulse with the counted value on the basis start pulse, and outputs the comparison result to the master clock generator 2354.

The master clock generator 2354 adjusts the timing of the master clock depending on the comparison result outputted from the timing calculator 2353. More specifically, when the value counted on the basis of the start pulse is larger than the value counted on the basis of the internal on-time start pulse, the master clock generator 2354 determines that a digital sampling time is later than a reference time and controls the master clock earlier than the sampling time by a difference between the counted value on the basis of the start pulse and the counted value on the basis of the internal on-time start pulse. Contrary to this, when the value counted on the basis of the start pulse is smaller than the value counted on the basis of the internal on-time start pulse, the master clock generator 2354 determines that the digital sampling time is earlier than the reference time and controls the master clock later than the digital sampling time by the difference between the counted value on the basis of the start pulse and the counted value on the basis of the internal on-time start pulse. By this configuration, a signal corresponding to the detected maximum energy value is the on-time signal E(on). Therefore, the frequency synchronizer 240 can compensate the frequency offset by using the signal having the maximum energy value.

Figure 5:
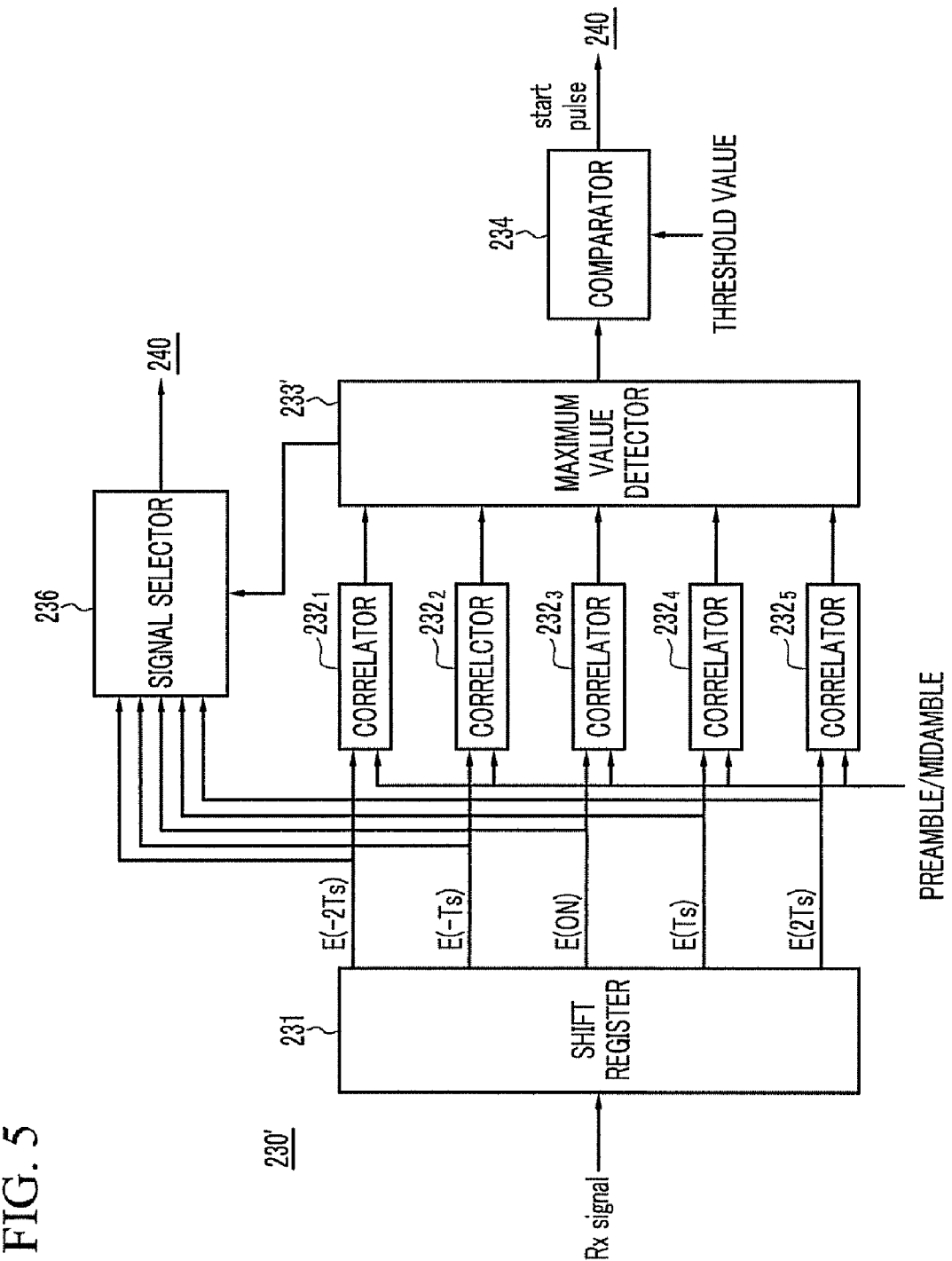

FIG. 5 is a block diagram illustrating a time synchronizer according to a second embodiment of the present invention.

Referring to FIG. 5, a time synchronizer 230' is similar to the time synchronizer 230 according to the first embodiment of the present invention, except that the time synchronizer 230' includes a signal selector 236 instead of the master clock controller 235. However, unlike the first embodiment, a maximum value detector 233' detects the maximum energy value among the correlation values calculated by the plurality of correlators $232_1$ to $232_5$ and transmits an index corresponding to the signal having the maximum energy value to the signal selector 236.

The signal selector 236 receives the signals E(−2Ts), E(−Ts), Es(on), E(Ts), and E(2Ts) outputted from the shift register 231 and selects a signal corresponding to the index transmitted from the maximum detector 233' among the received signals E(−2Ts), E(−Ts), Es(on), E(Ts), and E(2Ts), and outputs the selected signal to the frequency synchronizer 240.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for time synchronization of a received signal in an orthogonal frequency division multiplexing (OFDM) system, comprising:
    a shift register that sets one of a plurality of oversampled signals acquired by oversampling the received signal using a predetermined master clock as an on-time signal, shifts each of the remaining oversampled signals by a predetermined time on the basis of the on-time signal, and outputs the shifted signals and the on-time signal;
    a plurality of correlators that calculate a correlation value by correlating a corresponding signal among the shifted signals and the on-time signal with a previously known signal;
    a maximum value detector that detects a maximum energy value among the correlation values calculated by the plurality of correlators; and
    a comparator that detects a start point of a frame from the received signal by comparing a predetermined threshold value with the maximum energy value.

2. The apparatus for time synchronization of claim 1, further comprising a master clock controller that generates the master clock and outputs the master clock to the shift register,
    wherein the master clock has frequency at least four times higher than a minimum sampling frequency.

3. The apparatus for time synchronization of claim 2, wherein
    the comparator generates a start pulse depending on detection of the start point of the frame, wherein the master clock controller includes:
a synchronization trigger counter that counts a digital sample signal of a symbol on the basis of the start pulse;
a reference trigger counter that counts the digital sample signal of the symbol on the basis of an initial internal start pulse;
a timing calculator that compares a value counted by the reference trigger counter with the value counted by the synchronization trigger counter to output the comparison result; and
a master clock generator that controls the timing of the master clock depending on the comparison result,
wherein the on-time signal is fast Fourier transformed.

4. The apparatus for time synchronization of claim 1, further comprising
a signal selector that selects and outputs a signal having the maximum energy value between the shifted signals and the on-time signal,
wherein the signal having the maximum energy value is fast Fourier transformed.

5. The apparatus for time synchronization of claim 4, wherein:
the maximum value detector provides an index corresponding to the signal having the detected maximum energy value to the signal selector; and
the signal selector selects and outputs the signal having the maximum energy value depending on the index.

6. The apparatus for time synchronization of claim 1, wherein
the previously known signal is a preamble signal or a midamble signal.

7. A method for time synchronization of a received signal in an orthogonal frequency division multiplexing (OFDM) system, comprising:
oversampling and outputting the received signal by a predetermined master clock;
setting one of the oversampled signals to an on-time signal, shifting the remaining oversampled signals by a predetermined time on the basis of the on-time signal;
calculating a plurality of correlation values by correlating each of the on-time signal and the shifted signals with a previously known signal;
detecting a maximum energy value among the plurality of correlation values;
comparing a predetermined threshold value with the maximum energy value; and
detecting a start point of a frame from the received signal by comparing the threshold value with the maximum energy value.

8. The method for time synchronization of claim 7, further comprising generating the master clock,
wherein the master clock has a frequency at least four times higher than a minimum sampling frequency.

9. The method for time synchronization of claim 8, further comprising generating a start pulse indicating detection of the start point of the frame,
wherein generating master clock includes adjusting the timing of the master clock by using the generated start pulse and an initial internal start pulse, and
the on-time signal is fast Fourier transformed.

10. The method for time synchronization of claim 7, further comprising outputting the signal having the maximum energy value among the on-time signal and the shifted signals,
wherein the signal having the maximum energy value is fast Fourier transformed.

11. The method for time synchronization of claim 7, wherein the previously known signal is a preamble signal or a midamble signal.

12. A reception apparatus of an orthogonal frequency division multiplexing (OFDM) system, comprising:
an analog to digital converter that converts a received signal into a digital sample signal;
a packet detector that detects whether or not a packet is received by using the digital sample signal;
a time synchronizer that oversamples the digital sample signal using a master clock having a frequency higher than a minimum sampling frequency when the packet is received, and detects a start point of a frame and a signal having the maximum energy value from the received signal by using the oversampled signal and a previously known signal;
a frequency synchronizer that compensates a frequency offset by using the start point of the frame and the signal having the maximum energy value;
a fast Fourier transformer that fast Fourier transforms the signal having the compensated frequency offset; and
a demodulator that demodulates the fast Fourier transformed signal to restore data.

13. The reception apparatus of claim 12, wherein the time synchronizer includes:
a shift register that sets one of the oversampled signals to an on-time signal and shifts each of the remaining oversampled signals by a predetermined time on the basis of the on-time signal;
a plurality of correlators that calculate a correlation value by correlating a corresponding signal among the on-time signal and the shifted signals with a previously known signal;
a maximum value detector that detects the maximum energy value among the correlation values calculated by the plurality of correlators; and
a comparator that detects the start point of the frame from the received signal by comparing a predetermined threshold value with the maximum energy value.

14. The reception apparatus of claim 13, wherein the master clock has a frequency at least four times higher than the minimum sampling frequency.

15. The reception apparatus of claim 13, wherein the time synchronizer selects a signal having the maximum energy value among the on-time signal and the shifted signals and outputs the signal to the frequency synchronizer.

* * * * *